United States Patent
Tse et al.

(10) Patent No.: US 8,418,913 B2
(45) Date of Patent: Apr. 16, 2013

(54) METHOD AND APPARATUS FOR GENERATING AND USING AN OPTIONS ENABLEMENT SHEET TO ACTIVATE OPTIONS ON AN IMAGE PRODUCTION DEVICE

(75) Inventors: Francis Kapo Tse, Rochester, NY (US); Lee D. Roche, Biggleswade (GB); Kari Poysa, Macedon, NY (US); David Shuman, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 607 days.

(21) Appl. No.: 12/605,710

(22) Filed: Oct. 26, 2009

(65) Prior Publication Data
US 2011/0095079 A1 Apr. 28, 2011

(51) Int. Cl.
*G06F 17/00* (2006.01)
*G03G 15/00* (2006.01)

(52) U.S. Cl.
USPC ............................................ 235/375; 399/85

(58) Field of Classification Search .................. 235/375; 399/84, 85
See application file for complete search history.

(56) References Cited

U.S. PATENT DOCUMENTS

| | | | | |
|---|---|---|---|---|
| 5,729,350 | A * | 3/1998 | Ozaki | 358/296 |
| 5,777,315 | A * | 7/1998 | Wilz et al. | 235/462.15 |
| 2003/0095810 | A1 * | 5/2003 | Haines et al. | 399/84 |
| 2006/0285126 | A1 | 12/2006 | Braswell et al. | |
| 2007/0139683 | A1 | 6/2007 | Wegeng et al. | |

OTHER PUBLICATIONS

Paul Siddle: "Method and Apparatus for Configuring an Image Production Device"; U.S. Appl. No. 12/251,836, filed Oct. 15, 2008.

* cited by examiner

*Primary Examiner* — Jamara Franklin
(74) *Attorney, Agent, or Firm* — Ronald E. Prass, Jr.; Prass LLP (57) ABSTRACT

A method and apparatus for generating an options enablement sheet to activate options for an image production device is disclosed. The method may include receiving a request to generate an options enablement sheet, receiving options enablement and image production device information, encoding the options enablement and image production device information into one or more machine-readable markings, generating an options enablement sheet that includes the one or more machine-readable markings, receiving a transmission mode selection, and transmitting the options enablement sheet to a user of the image production device using the selected transmission mode. The options enablement sheet may be received by a user and scanned by the image production device to activate the options.

24 Claims, 8 Drawing Sheets

Xerox WorkCenter 76xx
Options Enablement Sheet Generation

Enter Machine Serial No. ⬜ ——610

Select Options and Enable Duration

|  | 1 year | 2 year | No Limit |
|---|---|---|---|
| Job Accounting | ☐ | ☐ | ☐ |
| Job Override | ☐ | ☐ | ☐ |
| Disk | ☐ | ☐ | ☐ |
| Internet FAX | ☐ | ☐ | ☐ |
| Scan to File | ☐ | ☐ | ☐ |
| Wireless | ☐ | ☐ | ☐ |

——620

Click here to generate Paper ——630

METHOD AND APPARATUS FOR GENERATING AND USING AN OPTIONS ENABLEMENT SHEET TO ACTIVATE OPTIONS ON AN IMAGE PRODUCTION DEVICE

BACKGROUND

Disclosed herein is a method for generating and using an options enablement sheet to activate options on an image production device, as well as corresponding apparatus and computer-readable medium.

In conventional image production devices, options enablement can be performed in different ways. Some of the processes involve providing password codes to customers to key in to the device to turn on an option. These processes are cumbersome for the user.

Other more convenient ways are the use of memory devices, such as Subscriber Identity Cards (or SIM cards), to store secure enablement data that a customer or installer can use to download the "key" to turn the options. However, the SIM cards cost a significant amount of money per card and require special equipment to manufacture and program, as well as special access hardware on the image production device. In addition, SIM cards are routinely ordered and stocked well in advance of use resulting in additional inventory cost.

SUMMARY

A method and apparatus for generating an options enablement sheet to activate options for an image production device is disclosed. The method may include receiving a request to generate an options enablement sheet, receiving options enablement and image production device information, the options enablement information being information pertaining to the activation of options on the image production device, encoding the options enablement and image production device information into one or more machine-readable markings, generating an options enablement sheet that includes the one or more machine-readable markings, receiving a transmission mode selection, and transmitting the options enablement sheet to a user of the image production device using the selected transmission mode.

In addition, a method and apparatus for activating options on an image production device using an options enablement sheet is also disclosed. The method may include receiving a request to scan an options enablement sheet having one or more machine-readable markings, scanning the options enablement sheet, decoding the options enablement information and image production device identification information contained in the one or more machine-readable markings, determining if the decoded image production device identification information matches the identification information associated with the image production device, wherein if it is determined that the decoded image production device identification information matches the identification information associated with the image production device, activating options identified in the decoded options enablement information, and notifying a user that the identified options are activated.

DETAILED DESCRIPTION

Aspects of the embodiments disclosed herein relate to a method and apparatus for generating and using an options enablement sheet to activate options on an image production device.

The disclosed embodiments may include a method for generating an options enablement sheet to activate options for an image production device is disclosed. The method may include receiving a request to generate an options enablement sheet, receiving options enablement and image production device information, the options enablement information being information pertaining to the activation of options on the image production device, encoding the options enablement and image production device information into one or more machine-readable markings, generating an options enablement sheet that includes the one or more machine-readable markings, receiving a transmission mode selection, and transmitting the options enablement sheet to a user of the image production device using the selected transmission mode.

The disclosed embodiments may further include an options enablement sheet generation apparatus that may include a communication interface that facilitates transmissions from the options enablement sheet generation apparatus, and an options enablement sheet generator that receives a request to generate an options enablement sheet, receives options enablement and image production device information, encodes the options enablement and image production device information into one or more machine-readable markings, generates an options enablement sheet that includes the one or more machine-readable markings, receives a transmission mode selection, and transmits the options enablement sheet through the communication interface to a user of the image production device using the selected transmission mode, wherein the options enablement information being information pertaining to the activation of options on the image production device.

In addition, the disclosed embodiments may include a method for activating options on an image production device using an options enablement sheet is also disclosed. The method may include receiving a request to scan an options enablement sheet having one or more machine-readable markings, scanning the options enablement sheet, decoding the options enablement information and image production device identification information contained in the one or more machine-readable markings, determining if the decoded image production device identification information matches the identification information associated with the image production device, wherein if it is determined that the decoded image production device identification information matches the identification information associated with the image production device, activating options identified in the decoded options enablement information, and notifying a user that the identified options are activated.

The disclosed embodiments may further include an image production device that may include a scanner, and an options enablement sheet processing unit that receives a request to scan an options enablement sheet having one or more machine-readable markings, scans the options enablement sheet using the scanner, decodes the options enablement information and image production device identification information contained in the one or more machine-readable markings, determines if the decoded image production device identification information matches the identification information associated with the image production device, wherein if the options enablement sheet processing unit determines that the decoded image production device identification information matches the identification information associated with the image production device, the options enablement sheet processing unit activates options identified in the decoded options enablement information, and notifies a user that the identified options are activated.

The disclosed embodiments may concern a method and apparatus for generating and using an options enablement sheet to activate options on an image production device. The options enablement sheet may also be known as a paper subscriber identity module (or "paper SIM"). The options enablement sheet may be printed on any substrate of any color, size, shape or thickness, including paper, cardboard, card stock, photo stock, plastic, etc. In addition, the options enablement sheet may be printed with machine-readable markings, such as one, two or three dimensional bar-codes, DataGlyphs®, etc., for example, that contain encoded option enablement information and image production device identification information. The options enablement sheets may be generated by any image production device processing device (e.g., computer, server, etc.) so that the machine-readable markings that contained thereon, may be read by the scanner of the image production device. Options enablement sheets can be faxed, emailed, shipped with the machine, or sent to a mobile communication device, etc. and scanned on the user's end by the image production device.

As opposed to relatively expensive SIM cards, the cost of the options enablement sheet is minimal as it is the cost of a printed page that can be generated and read from a variety of platforms. If the options enablement sheet is lost or damaged, it is easily replaced at almost no cost. In addition, the options enablement sheet can replace the need for the users or tech reps to type in long enablement passwords.

For new machines at the factory (or wherever location that is appropriate to generate the options enablement sheet, such as distribution centers, showrooms, retail stores, etc.), options enablement sheets may be generated by any device that can generate a document with machine-readable markings. The operator at the factory may enter serial number of the image production device and enter options that the customer ordered to a local or web-based application. The operator may elect to print the options enablement sheet and attach it to the image production device for shipping. Alternatively, the operator may elect to print the options enablement sheet and attach it to an e-mail or fax or have it sent electronically by the apparatus generating the options enablement sheet (e.g., computer, server, image production device, personal digital assistant (PDA), etc.). The options enablement sheet may also be sent to a mobile communication device, such as a mobile telephone, smart phone, PDA, laptop, personal tablet reading device, etc.

The user may also order option via a website, telephone, fax, e-mail, etc. The user or a sales representative may enter serial number of image production device and options via a local or web application. Payment information may be provided and processed and the user may be given an option to print the options enablement sheet to a local printer, have a printable file e-mailed to an e-mail receiving device (e.g., computer, mobile telephone, electronic tablet reader) or have a copy faxed to a designated fax machine. This process may also be used to request a replacement options enablement sheet where the payment step is replaced by verification that options had been paid for and authorized.

Once the options enablement sheet has been received, the options enablement sheet may be placed on the platen (or Duplex Automatic Document Handler (DADH)) of the image production device and the user may select an options enablement service option (through one of the menus on the user interface, for example). The user may push a button to scan the options enablement sheet and the options enablement sheet may be scanned. The machine-readable markings may be read and the options enablement and image production device information may be decoded. A options enablement sheet processing unit may check to make sure that the decoded serial number on the options enablement sheet matches the serial number of the image production device on which the option are being enabled.

If the decoded serial number on the options enablement sheet matches the serial number of the image production device on which the option are being enabled, the options may be enabled (permanently or for the duration indicated in the options enablement information) and the user interface may indicate that the options enablement was successful.

Note that the options enablement sheet may include options and serial number information for multiple image production devices. In this instance, options on several machines that are shipped to or owned/leased by a user may be activated using a single options enablement sheet.

Figure 1:
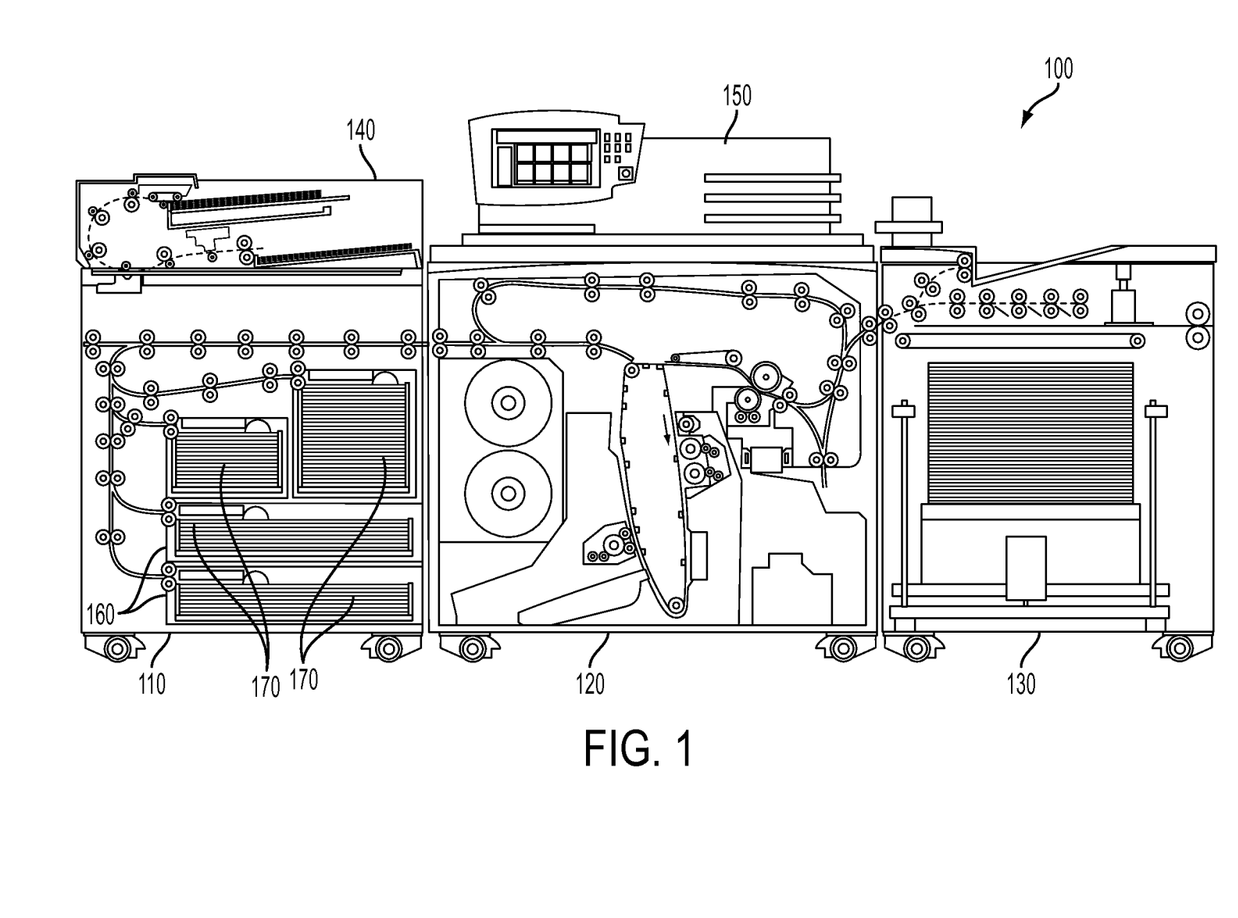
FIG. 1 is an exemplary diagram of an image production device in accordance with one possible embodiment of the disclosure.

The options enablement sheet can be used as a common options enablement approach for image production devices. It can be used on unconnected devices or on devices before it had been connected to the network (e.g., during initial installation) as replacement for current SIM card. It can replace the use of PIN number entry approaches and can be a supplement to options enablement via the net. It can also be the options enablement standard for machines that are not connected to the net or machines in locations behind network secure firewalls FIG. 1 is an exemplary diagram of an image production device 100 in accordance with one possible embodiment of the disclosure. The image production device 100 may be any device or combination of devices that may be capable of making image production documents (e.g., printed documents, copies, etc.) including a copier, a printer, a facsimile device, and a multi-function device (MFD), for example.

The image production device 100 may include an image production section 120, which includes hardware by which image signals are used to create a desired image, as well as a stand-alone feeder section 110, which stores and dispenses sheets on which images are to be printed, and an output section 130, which may include hardware for stacking, folding, stapling, binding, etc., prints which are output from the marking engine. If the image production device 100 is also operable as a copier, the image production device 100 may further includes a document feeder 140, which operates to convert signals from light reflected from original hard-copy image into digital signals, which are in turn processed to create copies with the image production section 120. The image production device 100 may also include a local user interface 150 for controlling its operations, although another source of image data and instructions may include any number of computers to which the printer is connected via a network.

With reference to feeder section 110, the section may include any number of trays 160, each of which stores a media stack 170 or print sheets ("media") of a predetermined type (size, weight, color, coating, transparency, etc.) and may include a feeder to dispense one of the sheets therein as instructed. Certain types of media may require special handling in order to be dispensed properly. For example, heavier or larger media may desirably be drawn from a media stack 170 by use of an air knife, fluffer, vacuum grip or other application (not shown in the Figure) of air pressure toward the top sheet or sheets in a media stack 170. Certain types of coated media may be advantageously drawn from a media stack 170 by the use of an application of heat, such as by a stream of hot air (not shown in the Figure). Sheets of media drawn from a media stack 170 on a selected tray 160 may then be moved to the image production section 120 to receive one or more images thereon. Then, the printed sheet is then moved to output section 130, where it may be collated, stapled, folded, punched, etc., with other media sheets in manners familiar in the art.

Figure 2:
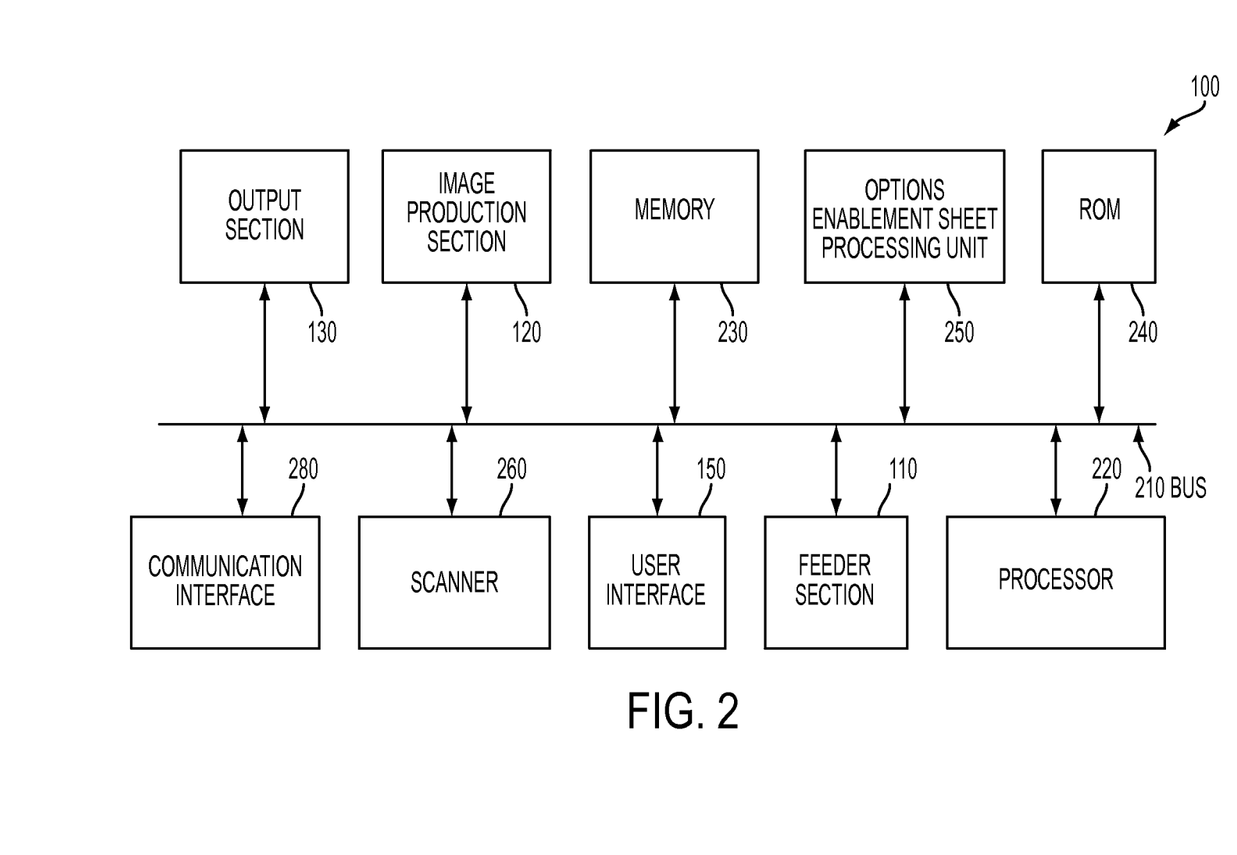
FIG. 2 is an exemplary block diagram of the image production device in accordance with one possible embodiment of the disclosure.

FIG. 2 is an exemplary block diagram of the image production device 100 in accordance with one possible embodiment of the disclosure. The image production device 100 may include a bus 210, a processor 220, a memory 230, a read only memory (ROM) 240, a options enablement sheet processing unit 250, a feeder section 110, an output section 130, a user interface 150, a scanner 260, a communication interface 280, and an image production section 120. Bus 210 may permit communication among the components of the image production device 100.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

User interface 150 may include one or more conventional mechanisms that permit a user to input information to and interact with the image production unit 100, such as a keyboard, a display, a mouse, a pen, a voice recognition device, touchpad, buttons, etc., for example. Output section 130 may include one or more conventional mechanisms that output image production documents to the user, including output trays, output paths, finishing section, etc., for example. The image production section 120 may include an image printing and/or copying section, a scanner, a fuser, etc., for example. The scanner 260 may be any device that may scan documents and may create electronic images from the scanned document. The scanner may also scan, recognize, and decode marking-readable codes or markings, for example.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

Figure 3:
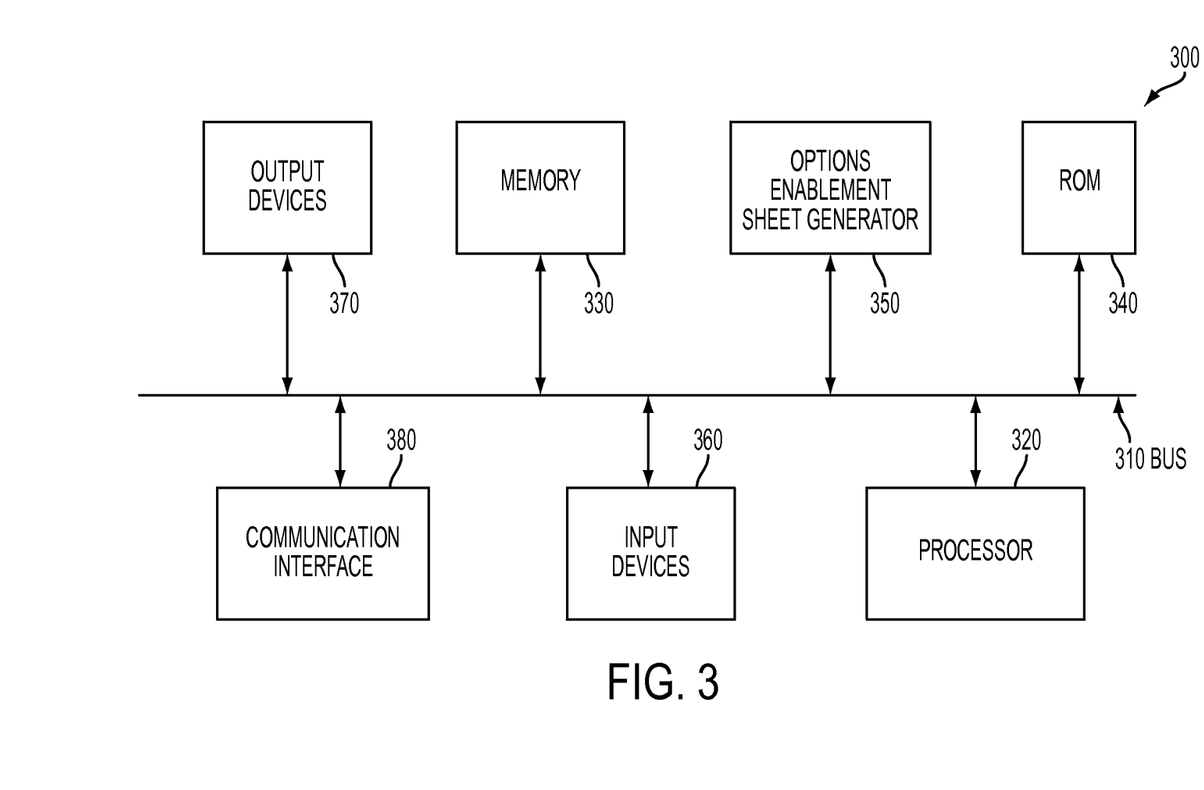
FIG. 3 is an exemplary block diagram of an options enablement sheet generation apparatus in accordance with one possible embodiment of the disclosure.

FIG. 3 is an exemplary block diagram of a options enablement sheet generation apparatus 300 in accordance with one possible embodiment of the disclosure. The options enablement sheet generation apparatus 300 may include a bus 310, a processor 320, a memory 330, a read only memory (ROM) 340, a options enablement sheet generator 350, input devices 360, output devices 370, and communication interface 380. Bus 310 may permit communication among the components of the options enablement sheet generation apparatus 300.

Processor 320 may include at least one conventional processor or microprocessor that interprets and executes instructions. Memory 330 may be a random access memory (RAM) or another type of dynamic storage device that stores information and instructions for execution by processor 320. Memory 330 may also include a read-only memory (ROM) which may include a conventional ROM device or another type of static storage device that stores static information and instructions for processor 320.

Communication interface 380 may include any mechanism that facilitates communication via a network. For example, communication interface 380 may include a modem. Alternatively, communication interface 380 may include other mechanisms for assisting in communications with other devices and/or systems.

ROM 340 may include a conventional ROM device or another type of static storage device that stores static information and instructions for processor 320. A storage device may augment the ROM and may include any type of storage media, such as, for example, magnetic or optical recording media and its corresponding drive.

Input devices 360 may include one or more conventional mechanisms that permit a user to input information to the options enablement sheet generation apparatus 300, such as a keyboard, a mouse, a pen, a voice recognition device, etc. Output devices 370 may include one or more conventional mechanisms that output information to the user, including a display, a printer, one or more speakers, or a medium, such as a memory, or a magnetic or optical disk and a corresponding disk drive.

The options enablement sheet generation apparatus 300 may perform such functions in response to processor 320 by executing sequences of instructions contained in a computer-readable medium, such as, for example, memory 330. Such instructions may be read into memory 330 from another computer-readable medium, such as a storage device or from a separate device via communication interface 380.

The options enablement sheet generation apparatus 300 may represent an apparatus at the original equipment manufacturer (OEM) or service representative for the image production device 100, for example. The options enablement sheet generation apparatus 300 may include one or more processing devices, such as a computer, server, etc., that may be able to communicate with the image production device 100 and may be able to send faxes and e-mails that include options enablement sheets to the device 100. Alternatively, faxes and e-mails may be generated by one processing device (e.g., server, computer, etc.) and input to another communication device for transmission, for example. The image production device 100 may be able to decode the machine-readable markings on the options enablement sheet into text, audio, etc. and/or perform the options enablement function that was previously encoded and transmitted by the options enablement sheet generation apparatus 300, for example.

The options enablement sheet generation apparatus 300 may also include an image production device database in the memory that may include stored information on the type of image production device 100, such as for device/service registration, diagnostic, set-up, maintenance purposes, etc. In addition, the image production device database may also include stored information related to individual image production devices 100 owned or leased by users. This information may be organized by image production device 100 serial numbers and may be linked to user profiles and service profile information, for example. The encoded device serial number on the options enablement sheet may cause the stored image production device information to be called up from the image production device database by the options enablement sheet generation apparatus 300 in order to process an options order and generate an options enablement sheet, for example. The image production device database may archive options enablement information on the individual or collective image production devices 100, as well.

The image production device 100 and options enablement sheet generation apparatus 300 illustrated in FIGS. 1-3 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 100 and options enablement sheet generation apparatus 300, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like that are capable of displaying the print release marking and can be scanned by the image production device.

The operation of components of the options enablement sheet generator 350 and the options enablement sheet generation process will be discussed in relation to the flowchart in FIG. 4.

Figure 4:
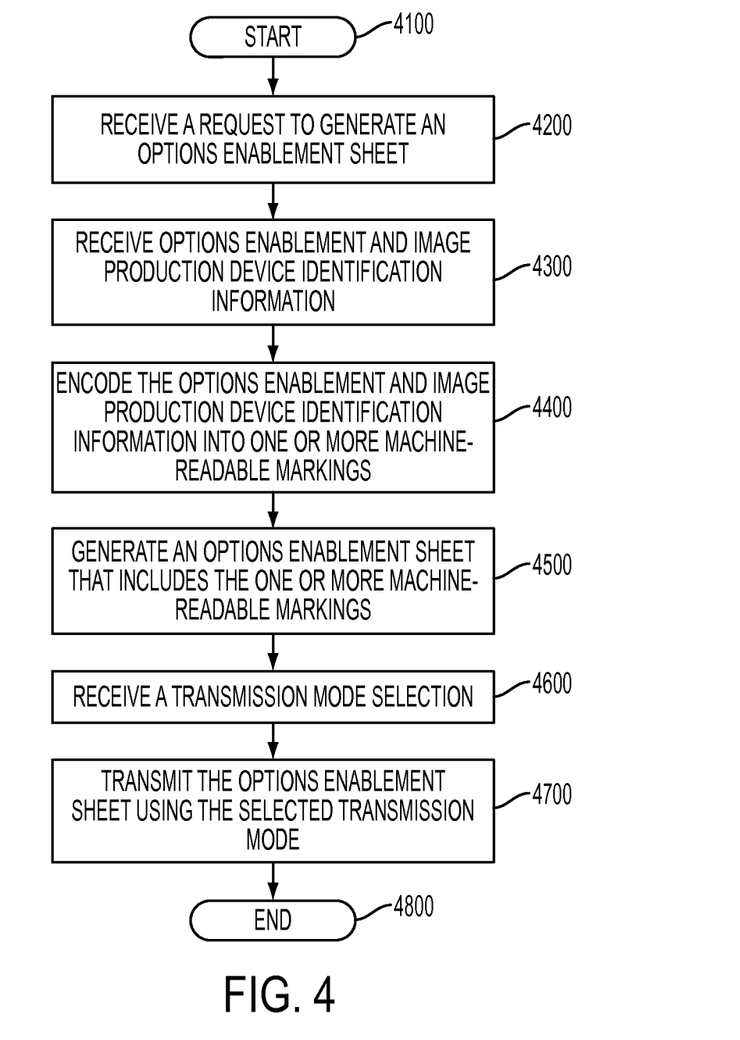
FIG. 4 is a flowchart of an exemplary options enablement sheet generation process in accordance with one possible embodiment of the disclosure.

FIG. 4 is a flowchart of an exemplary options enablement sheet generation process in accordance with one possible embodiment of the disclosure. The process may begin at step 4100, and may continue to step 4200 where the options enablement sheet generator 350 may receive a request to generate a options enablement sheet.

At step 4300, the options enablement sheet generator 350 may receive options enablement and image production device information. The options enablement information may include information pertaining to the activation of options on the image production device and the image production device information may include the image production device serial number, for example. At step 4400, the options enablement sheet generator 350 may encode the options enablement and image production device information into one or more machine-readable markings. The one or more machine-readable markings may be any one, two, or three-dimensional machine-readable marking, such as a one-dimensional bar code, a two-dimensional bar code, a three-dimensional bar code, or a DataGlyph®, for example. In addition, machine-readable markings may also include markings that may be read by optical character recognition (OCR), for example.

At step 4500, the options enablement sheet generator 350 may generate a options enablement sheet that includes the one or more machine-readable markings. At step 4600, the options enablement sheet generator 350 may receive a transmission mode selection. The selected transmission mode may be either electronically e-mail, electronically fax, e-mail to a mobile communication device, text message to a mobile communication device, and printing the options enablement sheet so it may be one of e-mailed, mailed and faxed to the user. Note that the telephone line may be any analog, digital, or voice-suitable telephone line through any wired or wireless medium, etc. (e.g., wire, cable, air, etc.). Note also that an intermediate device (computer, server, fax machine, image production device, portable digital assistant (PDA), etc.) may be used to relay the options enablement sheet to a transmission device for transmission or to an output device to output the options enablement sheet for printing and faxing, emailing, etc.

At step 4700, the options enablement sheet generator 350 may transmit the options enablement sheet through the communication interface 380 to a user of the image production device 100 using the selected transmission mode. Note that the selection transmission mode may include having the options enablement sheet generator 350 print the options enablement sheet so it may be faxed or automatically faxed by the options enablement sheet generation apparatus 300 if that capability exists and is operating. The process may then go to step 4800, and end.

Note that if a network, such as the Internet is not available or firewalled, transmission by faxing or e-mail may be performed through telephone communication using a wired or wireless telephone phone line. The fax or e-mail may include an attachment, such as the options enablement sheet which may be in a common format, such as a word processing document, PDF, etc., for example. Note that in this instance, the word processing document, PDF, etc. may be considered electronic data relating to a picture of the machine-readable markings which contain the options enablement information.

As such, the communications network may represent any communication and/or media network, such as the Internet, intranet, telephone network, cable television network, satellite television network, satellite radio network or any other network system known to one of skill in the art that may be able to transmit wired or wireless fax and e-mail transmissions, for example, to transmit the options enablement sheet image to a user.

The operation of components of the options enablement sheet processing unit 250 and the options enablement sheet processing process will be discussed in relation to the flowchart in FIG. 5.

Figure 5:
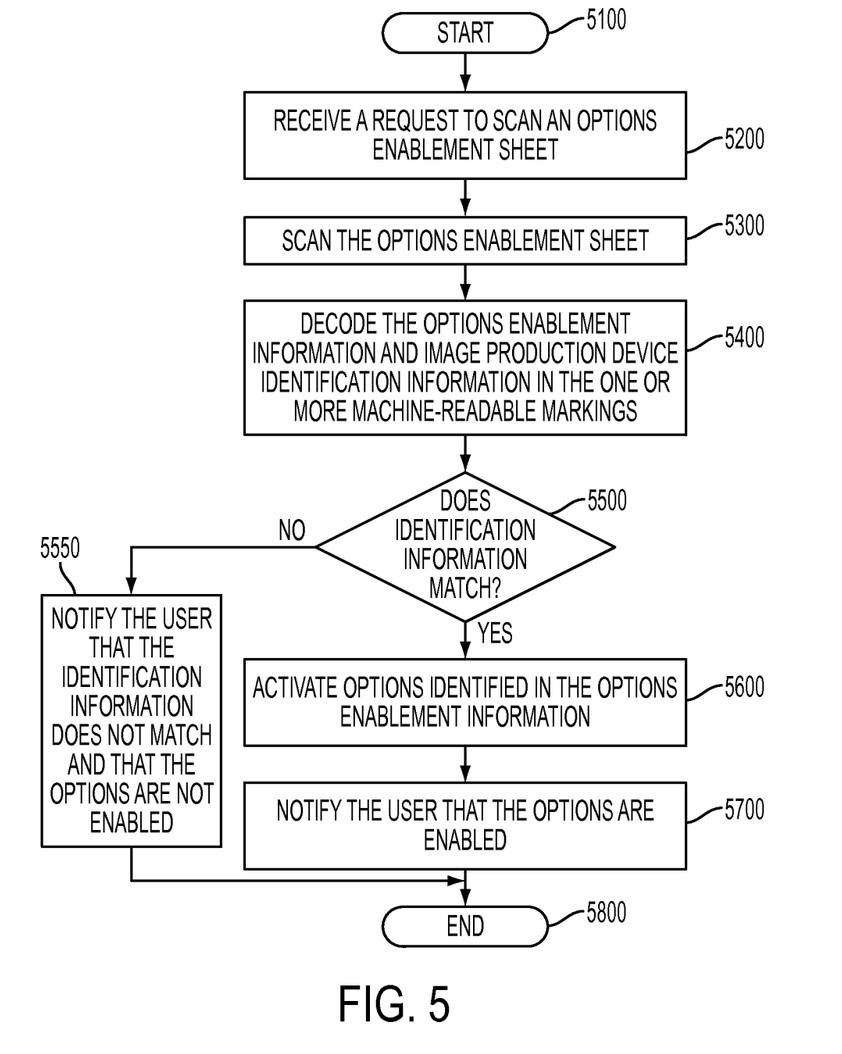
FIG. 5 is a flowchart of an exemplary options enablement sheet processing process in accordance with one possible embodiment of the disclosure.

FIG. 5 is a flowchart of an exemplary options enablement sheet processing process in accordance with one possible embodiment of the disclosure. The process may begins at step 4100, and may continue to step 4200 where the options enablement sheet processing unit 250 may receive a request to scan a options enablement sheet having one or more machine-readable markings. At step 5300, the options enablement sheet processing unit 250 may scan the options enablement sheet using the scanner 260.

At step 5400, the options enablement sheet processing unit 250 may decode the options enablement information and image production device identification information contained in the one or more machine-readable markings. At step 5500, the options enablement sheet processing unit 250 may determine if the decoded image production device identification information matches the identification information associated with the image production device. If the options enablement sheet processing unit 250 determines that the decoded image production device identification information does not match the identification information associated with the image production device, at step 5550, the options enablement sheet processing unit 250 may notify the user that the decoded identification information does not match the identification information associated with the image production device 100 and that the decoded options are not enabled. The process may then go to step 5800, and end.

However, if at step 5500, the options enablement sheet processing unit 250 determines that the decoded image production device identification information matches the identification information associated with the image production device, the process may go to step 5600 where the options enablement sheet processing unit 250 may activate option identified in the decoded options enablement information. At step 5700, the options enablement sheet processing unit 250 may notify a user that the identified options are activated. The process may then go to step 5800, and end.

The options enablement sheet processing unit 250 may send a receipt that a receipt to the options enablement sheet generation apparatus 300 that the options are activated. This receipt may be received by e-mail or return fax, for example.

Figure 6:
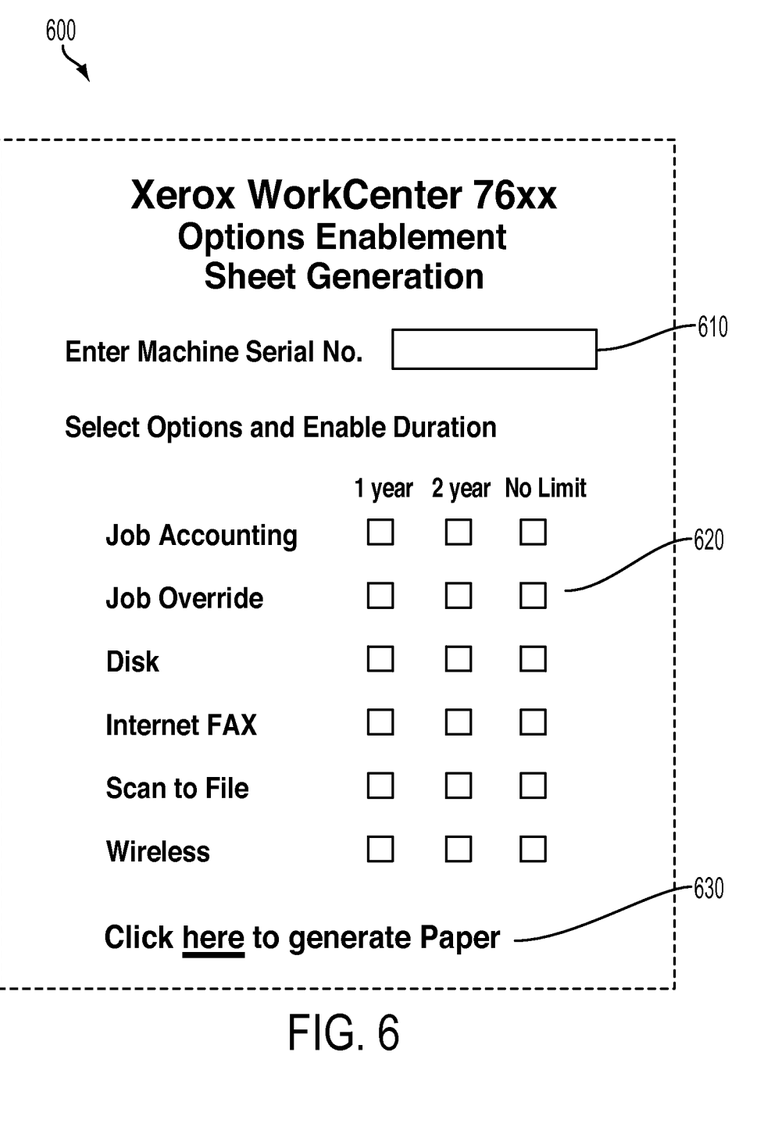
FIG. 6 is an exemplary options enablement request form in accordance with one possible embodiment of the disclosure.

FIG. 6 is an exemplary options enablement request form 600 in accordance with one possible embodiment of the disclosure. The options enablement request form 600 may be presented from a local or web-based application and may include a block to enter image production device (machine) serial number information 610, boxes to enter options to be ordered/enabled 620, and a link to generate a options enablement sheet that will encode the options enablement and image production device information into machine readable markings.

Figure 7:
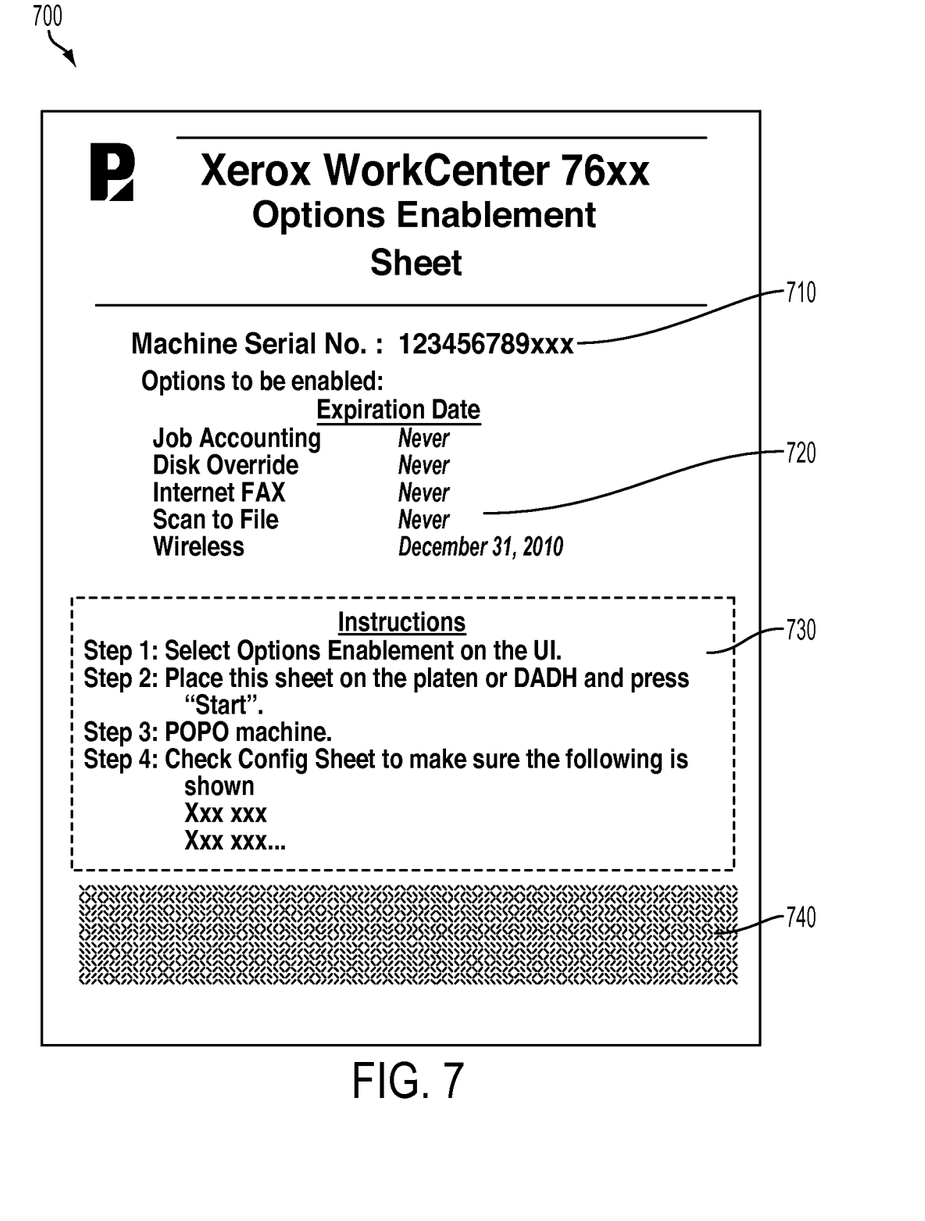
FIG. 7 is an exemplary options enablement sheet in accordance with one possible embodiment of the disclosure.

FIG. 7 is an exemplary options enablement sheet 700 in accordance with one possible embodiment of the disclosure. The exemplary options enablement sheet 700 may include image production device (machine) serial number information 710, a list of options to be enabled 720, instructions to the user on how to activate the options 730, and one or more machine readable markings 740. The options enablement sheet 700 may be printed on any substrate of any color, size, shape or thickness, including paper, cardboard, card stock, photo stock, plastic, etc., or it may also be an image sent to a processing device (computer, server, etc.) or mobile communication device, for example.

The one or more machine-readable markings 740 may be any one, two, or three-dimensional machine-readable marking, such as a one-dimensional bar code, a two-dimensional bar code, a three-dimensional bar code, or a DataGlyph®, for example. In addition, the machine-readable markings 740 may also include markings that may be read by optical character recognition (OCR), for example. The one or more machine-readable markings 740 may be located on predetermined portions of an image or a media sheet so that they may be more easily identified and read by an image processing device 100 or other processing device.

Also, the machine-readable markings 740 are shown on a single page only. Depending on the total amount of data that needs to be transmitted back to the user (e.g., if many machines needs options enabled, if a large number of options are required, etc.), more than one page of options enablement sheet 700 could be used.

Please note that that the options enablement request form 600 shown in FIG. 6 and the options enablement sheet 700 shown in FIG. 7 are merely illustrative. Details and other information may be added and the design may be modified as long as the options enablement and options enablement sheet generation and processing mechanisms are performed.

Figure 8:
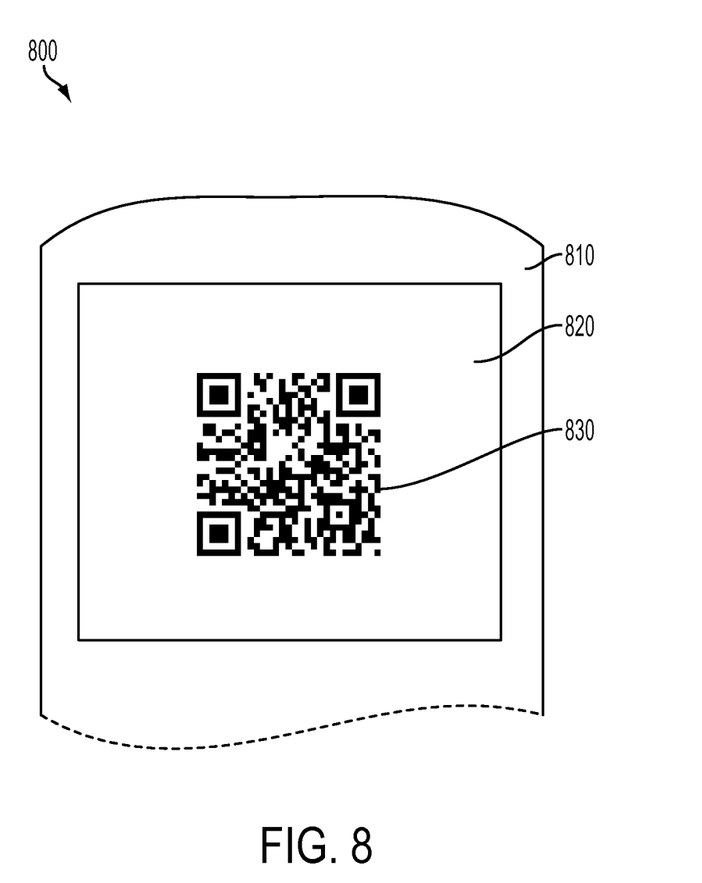
FIG. 8 is an exemplary options enablement sheet as it may appear on a user's mobile communication device in accordance with one possible embodiment of the disclosure.

FIG. 8 is an exemplary options enablement sheet 700 as it may appear on a user's mobile communication device 800 in accordance with one possible embodiment of the disclosure. As discussed above, the options enablement sheet 700 may be sent to a user's mobile communication device 800 by the options enablement sheet generation apparatus 300 by e-mail or text messaging, for example. The options enablement sheet 700 may include one or more machine readable markings 830. The options enablement sheet 700 may be received as an attachment and may be displayed on the display 820. The image of the machine-readable markings 830 may be shown on the display 820 so that they may be read by the image production device 100. The body 810 of the mobile communication device 800 may be placed on the platen of the image production device 100 and scanned to activate the options on the device 100.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for generating an options enablement sheet to activate options for an image production device, comprising:
   receiving a request to generate an options enablement sheet;
   receiving options enablement and image production device information, the options enablement information being information pertaining to the activation of options on the image production device;
   encoding the options enablement and image production device information into one or more machine-readable markings;
   generating an options enablement sheet that includes the one or more machine-readable markings;
   receiving a transmission mode selection; and
   transmitting the options enablement sheet to a user of the image production device using the selected transmission mode.

2. The method of claim 1, further comprising:
   receiving a receipt that the transmission was received by the user.

3. The method of claim 1, wherein the one or more machine-readable markings are at least one of a one-dimensional bar code, a two-dimensional bar code, and a three-dimensional bar code.

4. The method of claim 1, wherein the selected transmission mode is one of electronically e-mail, electronically fax, e-mail to a mobile communication device, text message to a mobile communication device, and printing the options enablement sheet so it may be one of e-mailed, mailed and faxed to the user.

5. The method of claim 1, wherein the one or more machine-readable markings are located on predetermined portions of one of an image and a media sheet.

6. The method of claim 1, wherein the image production device is one of a copier, a printer, a facsimile device, and a multi-function device.

7. A options enablement sheet generation apparatus, comprising:
   a communication interface that facilitates transmissions from the options enablement sheet generation apparatus; and
   an options enablement sheet generator that receives a request to generate an options enablement sheet, receives options enablement and image production device information, encodes the options enablement and image production device information into one or more machine-readable markings, generates an options enablement sheet that includes the one or more machine-readable markings, receives a transmission mode selection, and transmits the options enablement sheet through the communication interface to a user of the image production device using the selected transmission mode,
   wherein the options enablement information being information pertaining to the activation of options on the image production device.

8. The options enablement sheet generation apparatus of claim 7, wherein the options enablement sheet generator receives a receipt that the transmission was received by the user.

9. The options enablement sheet generation apparatus of claim 7, wherein the one or more machine-readable markings are at least one of a one-dimensional bar code, a two-dimensional bar code, and a three-dimensional bar code.

10. The options enablement sheet generation apparatus of claim 7, wherein the selected transmission mode is one of electronically e-mail, electronically fax, e-mail to a mobile communication device, text message to a mobile communication device, and printing the options enablement sheet so it may be one of e-mailed, mailed, and faxed to the user.

11. The options enablement sheet generation apparatus of claim 7, wherein the one or more machine-readable markings are located on predetermined portions of one of an image and a media sheet.

12. The options enablement sheet generation apparatus of claim 7, wherein the image production device is one of a copier, a printer, a facsimile device, and a multi-function device.

13. A method for activating options on an image production device using an options enablement sheet, comprising:
   receiving a request to scan an options enablement sheet having one or more machine-readable markings;
   scanning the options enablement sheet;
   decoding the options enablement information and image production device identification information contained in the one or more machine-readable markings;
   determining if the decoded image production device identification information matches the identification information associated with the image production device, wherein if it is determined that the decoded image production device identification information matches the identification information associated with the image production device,
   activating options identified in the decoded options enablement information; and
   notifying a user that the identified options are activated.

14. The method of claim 13, further comprising:
   sending a receipt to the options enablement sheet generation apparatus that the options are activated.

15. The method of claim 13, wherein if it is determined that the decoded image production device identification information does not match the identification information associated with the image production device,
   notifying the user that the decoded identification information does not match the identification information associated with the image production device and that the decoded options are not enabled.

16. The method of claim 13, wherein the one or more machine-readable markings are at least one of a one-dimensional bar code, a two-dimensional bar code, and a three-dimensional bar code.

17. The method of claim 13, wherein the options enablement sheet is received on a mobile communication device and the options enablement sheet is scanned from the mobile communication device.

18. The method of claim 13, wherein the image production device is one of a copier, a printer, a facsimile device, and a multi-function device.

19. An image production device, comprising:
   a scanner; and
   an options enablement sheet processing unit that receives a request to scan an options enablement sheet having one or more machine-readable markings, scans the options enablement sheet using the scanner, decodes the options enablement information and image production device identification information contained in the one or more machine-readable markings, determines if the decoded image production device identification information matches the identification information associated with the image production device, wherein if the options enablement sheet processing unit determines that the decoded image production device identification information matches the identification information associated with the image production device, the options enablement sheet processing unit activates options identified in the decoded options enablement information, and notifies a user that the identified options are activated.

20. The image production device of claim 19, wherein the options enablement sheet processing apparatus sends a receipt to the options enablement sheet generation apparatus that the options are activated.

21. The image production device of claim 19, wherein if the options enablement sheet processing unit determines that the decoded image production device identification information does not match the identification information associated with the image production device, the options enablement sheet processing unit notifies the user that the decoded identification information does not match the identification information associated with the image production device and that the decoded options are not enabled.

22. The image production device of claim 19, wherein the one or more machine-readable markings are at least one of a one-dimensional bar code, a two-dimensional bar code, and a three-dimensional bar code.

23. The image production device of claim 19, wherein the options enablement sheet is received on a mobile communication device and the options enablement sheet is scanned by the scanner from the mobile communication device.

24. The image production device of claim 19, wherein the image production device is one of a copier, a printer, a facsimile device, and a multi-function device.

* * * * *